Patented July 6, 1943

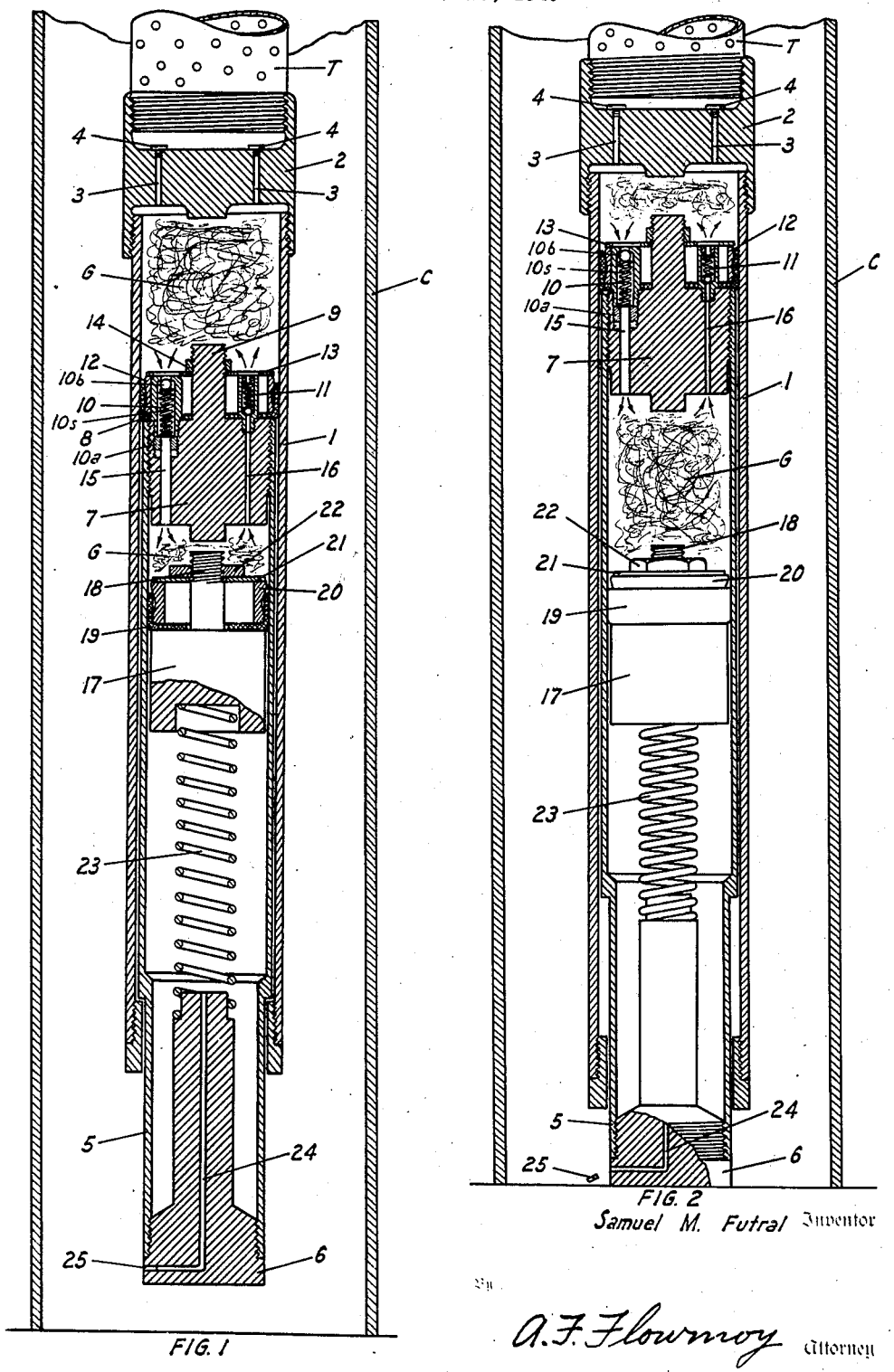

2,323,321

UNITED STATES PATENT OFFICE 2,323,321

HYDRAULIC TUBING FOOT

Samuel M. Futral, Rodessa, La.

Application December 26, 1940, Serial No. 371,768

2 Claims. (Cl. 166—4)

My invention relates to shock absorbing devices, and more particularly to shock absorbing devices for use on well tubing, or the like.

In the present day well practice oil is discovered sometimes at great depth, which necessitates the use of long strings of tubing. Strings of tubing in these wells will corkscrew and crumple on their bottom lengths when they drop only a few feet, and sometimes only a few inches. This is readily understandable when you take into account the tremendous weight of a string of tubing. A long string of tubing, if set on the bottom carefully, will not take on any permanent bends under its weight, even though it does contract in a corkscrew fashion. In the practice of pumping oil most of the weight of the tubing is held off of the bottom of the well, allowing the end to lightly rest on the bottom. Under this normal pumping practice, the tubing is stretched and contracted with each stroke of the pump. These stretches of the tubing amount to as much as eighteen to twenty-four inches, more or less, depending upon the depth to the oil. This brings about a very bad effect in that the bottom of the tubing is caused to pound the bottom of the well, because when it stretches it goes to the bottom of the well and when it contracts it lifts off of the bottom of the well. In addition to taking care of accidents to tubing from dropping by setting them down easily on the bottom of the well, my shock absorber is designed to work on the bottom of the string of tubing under normal pumping operations. Where my shock absorber is installed in pumping practice, it dampens the stretches in the tubing caused by the pumping, as described above. The shock absorber itself is lifted off of the bottom of the well only on the up stroke of the pump when the load on the tubing is lessened in this mode of its operation.

An object of my invention is to provide a shock absorber adapted to fit on the lower end of the string of well tubing to cushion the shock on tubing that falls and strikes the bottom of a well.

Another object of my invention is to provide an automatically resetting hydraulic type shock absorber.

Another object of my invention is to provide a hydraulic type shock absorber adapted for use with well tubing, or the like, designed to adjust itself on the bottom of the well to work under a predetermined, set working pressure.

Other objects and advantages of my invention will become apparent from reading a detailed description to follow of the illustrated device shown in the accompanying drawing illustrating a preferred form of a shock absorber embodying my invention.

In the drawing, Figure 1 is a vertical cross sectional view of a shock absorber embodying my invention shown in its extended position, and Figure 2 is a cross section view of the shock absorber illustrated in Figure 1 shown in a partially contracted position.

Numeral 1 designates the outer shell of my shock absorber shown in its working position inside of the casing C. My shock absorber, in its working position, is shown in Figures 1 and 2 attached to the lower end of the perforated bottom section of the tubing T below the oil pump not shown. My shock absorber is attached to the threaded end of the tubing T by means of the coupling block 2, designed to be screwed on the threaded end of the perforated tube T, and the threaded end of the outer shell 1 of the shock absorber.

The coupling block 2 is provided with a pair of holes 3 and closing plugs 4. The holes 3 are used only to introduce grease, or other suitable fluid, into my shock absorber. The grease is introduced through one of the holes 3 and the displaced air is passed out through the other hole 3. When sufficient grease, or other suitable fluid, is introduced into the shock absorber, both holes 3 are closed by means of closing plugs 4. Unless the grease, or other suitable fluid, is lost out of my shock absorber, or for any other reason it would need to be changed, the holes 3 would have no further use. Numeral 5 designates a hollow plunger member which is adapted to slide up and down inside of the outer shell 1. The lower end of the plunger 5 is closed by means of an adjustable foot plug 6, and is closed at its upper end by means of the valve block 7. The stroke of the plunger 5 may be varied by a change of the setting of the plug 6. To insure a tight fit between the hollow plunger 5 and the outer shell 1, I mount a valve cup 8 on the upper end of the valve block 7. This valve cup 8 is provided with a central hole through which the spacer clamping stud 9 of the valve block 7 extends, and is provided with additional holes through which the primary fluid valve 10 and secondary fluid valve 11 extend. The spacer clamping stud 9 keeps the valve block 7 from striking the coupling block 2 to insure a clearance, and to protect the primary fluid valve 10 and the secondary fluid valve 11. To both spread and clamp the valve cup 8 to the valve block 7, I employ a spreading ring 12. The spreading ring 12 is forced down by means of a clamping plate 13, which like the valve cup 8 is provided with holes to accommodate the clamping stud 9 and valves 10 and 11. I force the clamping ring down by means of clamping nut 14, which is threaded to the upper end of the spacer clamping stud 9.

The charge of fluid G is confined to the upper fluid chamber above valve block 7, the lower fluid chamber below valve block 7, the primary fluid passage 15, and the secondary fluid passage 16. An inspection of Figure 1 and Figure 2 of the drawing readily shows that the volumes of the upper and lower fluid chambers are varied by the position of the hollow plunger 5. In Figure 1 where the shock absorber is in its set position, and held off of the bottom of the well, most of the fluid is in the upper fluid chamber. Whereas, in the partially closed position of the shock absorber, shown in Figure 2, most of the fluid is in the lower chamber.

In the case of an accident, causing a string of tubing to fall provided on its lower end with my shock absorber, the foot 6 is the first thing that strikes the bottom of the well. The falling tubing, to reach the bottom of the well, must force the fluid G through the adjustable upwardly closing check valve 10 and through the primary fluid passage 15, from the upper fluid chamber to the lower fluid chamber, with the effect of slowing down the falling tubing and cushioning the blow of the falling tubing on the bottom of the well hole.

The desired working pressure for my shock absorber is determined by the setting of the check valve adjuster 10a, which may be screwed up or down to increase or decrease the pressure exerted by the check valve spring 10s on the check ball 10b.

It is next to impossible under prior practice to judge the pressure of a long string of tubing on the bottom of a well. This can be done, however, when my improved shock absorber tubing foot is used because the pressure is set in advance by means of the adjuster 10a. When the tubing, with one of my shock absorber tubing foots, is lowered to the bottom of the well, the pressure builds up to a predetermined pressure according to the setting of the adjuster 10a when the valve 10 yields and allows the fluid G to start passing through. As soon as the operator notices this change on his main weight gauge, he stops lowering the tubing T.

The lower fluid chamber is defined by the lower face of the valve block 7, a section of the wall of the hollow plunger 5, and upper face of the movable fluid return plunger 17. The fluid return plunger 17 is slidably mounted on the inside of the hollow plunger 5. A tight fit here is secured by means of a valve cup 19 spread and held in place by means of spreading ring 20, which is urged downwardly by means of clamping plate 21 under a clamp nut 22, which is threaded to the spacer clamping stud 18 of the fluid return plunger 17. The fluid return plunger 17 is supported on the foot plug 6 by means of a compression spring 23, which urges it upwardly. When the fluid return plunger 17 is forced down to accommodate the fluid passed through valve block 7 to the lower fluid chamber during an operation of the shock absorber, the tension of the spring 23 is increased. When the shock absorber is lifted off of the bottom of the well, compression spring 23 pushes the fluid return plunger 17 upwardly to force fluid G back up through the valve block 7, this time through the secondary fluid passage 16 and secondary fluid valve 11. The displaced fluid G from the lower fluid chamber into the upper fluid chamber in turn forces the hollow plunger 5 back down to its extended position, as shown in Figure 1. That is to say, the fluid returning operation sets the shock absorber for another shock absorbing operation.

Since the fluid returning operation may be carried out slowly, for economy's sake, the small secondary fluid valve 11 may be used, but it is to be understood that the secondary fluid valve 11 could be made the same size, or larger, than the primary fluid valve 10, and the secondary fluid passage 16 might accordingly be made the same size, or larger, than the primary fluid passage 15 without departing from the scope of this invention.

While it is not absolutely essential to the operation of my shock absorber, I provide an air passage 24 through the foot 6 of my shock absorber to allow the air to escape as the fluid return plunger 17 moves downwardly. To prevent water from seeping up into the shock absorber under operating conditions in a well, I have found it advisable to plug the bottom of the hole with a plug 25 made out of wood, or the like. The plug is lightly driven in so that when the plunger 17 moves down the plug 25 is blown out, as shown in Figure 2, to allow air to escape.

Under some conditions of operation the compressed air pressure under the fluid return plunger 17 is of advantage in the operation of my shock absorber. I then permanently close the air passage 24 with a plug made out of metal, or the like material.

My shock absorber should preferably be made out of steel, or other strong materials, to withstand the shock of a falling string of tubing, the force of which runs into tons of weight. My shock absorber may be made in varying sizes, as to diameter, to comply with diameters of well tubing, or the like. A shock absorber, according to my invention, that allows for a ten foot stroke of the hollow plunger, has been found to be suitable in oil well practice. However, many changes in the stroke, size of parts, arrangement of passages, and other changes, may be resorted to without departing from the scope of my invention.

Having thus described my invention, I claim:

1. A device of the class described comprising a tubular shell, a closing block on one end of the shell adapted for fastening onto the end of a well tubing or the like, a hollow plunger within the said shell, said hollow plunger including a transversely extending perforated partitioning member through which a fluid may pass when the plunger moves in the shell, a fluid returning plunger mounted within the said hollow plunger on a compression spring below the partitioning member adapted to force fluid through said partitioning member, said compression spring being mounted on a perforated plug located within the hollow plunger, said partitioning member being provided with a primary passageway for conducting a fluid down through the said partitioning member and an upward acting check valve for closing the said primary passageway, said partitioning member being also provided with a secondary passageway through which a fluid may be forced by means of the said fluid returning plunger and a check valve for closing the said secondary passageway.

2. A device of the class described comprising a tubular shell, a closing means on one end of the shell, a hollow plunger slidably mounted within the shell, said plunger being closed at its upper end by means of a perforated block through which a fluid may pass, said plunger being closed at its lower end by means of a perforated plug, and a fluid returning plunger within the said hollow plunger held in an elevated position by means of a compression spring, said perforated block being provided with a primary fluid passageway for conducting a fluid down through the block and an upward acting primary check valve to prevent any upward flow of fluid through the primary passageway, said block being also provided with a secondary fluid passageway through which fluid may be forced by means of the fluid returning plunger and a check valve adapted to prevent any downward flow of fluid through the secondary passageway.

SAMUEL M. FUTRAL.